(12) United States Patent
Kailey

(10) Patent No.: US 10,643,115 B1
(45) Date of Patent: May 5, 2020

(54) INK ESTIMATION ADJUSTMENT MECHANISM

(71) Applicant: Walter F. Kailey, Frederick, CO (US)

(72) Inventor: Walter F. Kailey, Frederick, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/457,017

(22) Filed: Jun. 28, 2019

(51) Int. Cl.
| | |
|---|---|
| *G06K 15/00* | (2006.01) |
| *G06K 15/02* | (2006.01) |
| *G06K 15/10* | (2006.01) |
| *H04N 1/00* | (2006.01) |
| *H04N 1/23* | (2006.01) |
| *H04N 1/60* | (2006.01) |
| *H04N 1/405* | (2006.01) |

(52) U.S. Cl.
CPC ......... *G06K 15/407* (2013.01); *G06K 15/027* (2013.01); *G06K 15/102* (2013.01); *G06K 15/1805* (2013.01); *G06K 15/1881* (2013.01); *H04N 1/00015* (2013.01); *H04N 1/00023* (2013.01); *H04N 1/00034* (2013.01); *H04N 1/00068* (2013.01); *H04N 1/00082* (2013.01); *H04N 1/00954* (2013.01); *H04N 1/2346* (2013.01); *H04N 1/405* (2013.01); *H04N 1/603* (2013.01)

(58) Field of Classification Search
CPC ........... H04N 1/00015; H04N 1/00023; H04N 1/00034; H04N 1/00068; H04N 1/00082; H04N 1/00087; H04N 1/00954; H04N 1/2346; H04N 1/407; H04N 1/4072; H04N 1/4074; H04N 1/52; H04N 1/6027; H04N 1/603; G06K 15/027; G06K 15/407; G06K 15/4075; G06K 15/1805; G06K 15/1881; G06F 3/1218; G06F 3/1229; G06F 3/1239; G06F 3/1296
See application file for complete search history.

(56) References Cited

U.S. PATENT DOCUMENTS

| | | | |
|---|---|---|---|
| 8,576,450 | B2 | 11/2013 | Shepherd et al. |
| 8,734,034 | B2 | 5/2014 | Morovic et al. |
| 9,096,056 | B2 | 8/2015 | Zhou et al. |
| 9,132,629 | B2 | 9/2015 | Ward et al. |
| 9,656,463 | B1 | 5/2017 | Ernst et al. |
| 9,785,873 | B2 | 10/2017 | Stanich et al. |
| 10,194,057 | B2 * | 1/2019 | Arizono ................. B41J 2/2103 |

(Continued)

FOREIGN PATENT DOCUMENTS

EP          0454448 A2     10/1991

*Primary Examiner* — Scott A Rogers
(74) *Attorney, Agent, or Firm* — Jaffery Watson Mendonsa & Hamilton LLP

(57) ABSTRACT

A system is disclosed. The system at least one physical memory device to store ink estimation logic and one or more processors coupled with the at least one physical memory device, to execute the ink estimation logic to generate first estimated ink usage data for each of one or more color planes based one or more gray level histograms and one or more halftone designs, detect a change to a tone curve of one or more of the color planes, modify the gray level histograms and generate second estimated ink usage data for each of the color planes based on the modified gray level histograms, wherein each gray level histogram corresponds to one of the one or more color planes and each halftone design corresponds to one of the one or more color planes.

21 Claims, 13 Drawing Sheets

(56) References Cited

U.S. PATENT DOCUMENTS

| | | |
|---|---|---|
| 2003/0179410 A1 | 9/2003 | Velde |
| 2007/0166059 A1* | 7/2007 | Kin .................... G03G 15/553 399/27 |
| 2010/0098443 A1* | 4/2010 | Oka ................... G03G 15/0131 399/39 |
| 2012/0026518 A1* | 2/2012 | Nishizawa ........... G03G 15/556 358/1.9 |
| 2017/0259560 A1 | 9/2017 | Sreenivasan et al. |
| 2019/0268482 A1* | 8/2019 | Stanich ................. H04N 1/605 |
| 2019/0270304 A1* | 9/2019 | Stanich ............... B41F 33/0009 |

* cited by examiner mult_array(:,:,1) =

254 230 90 16 2 25 82 222
247 214 132 41 8 58 156 189
99 148 181 140 74 123 173 107
33 66 165 206 239 197 115 49
2 25 82 222 255 230 90 16
8 58 156 189 247 214 132 41
74 123 173 107 99 148 181 140
239 197 115 49 33 66 165 206 mult_array(:,:,2) =

252 228 88 14 1 22 80 219
244 211 129 38 5 55 154 186
96 145 178 137 71 121 170 104
30 63 162 203 236 195 112 47
1 22 80 219 252 228 88 14
5 55 154 186 244 211 129 38
71 121 170 104 96 145 178 137
236 195 112 47 30 63 162 203 mult_array(:,:,3) =

250 225 85 11 0 19 77 217
241 208 126 36 3 52 151 184
93 143 175 134 69 118 167 101
27 60 159 200 233 192 110 44
0 19 77 217 250 225 85 11
3 52 151 184 241 208 126 36
69 118 167 101 93 143 175 134
233 192 110 44 27 60 159 200

| Original Transfer Function | | Inverse Original Transfer Function | | Desired Final Transfer Function | | Applied Transfer Function | |
|---|---|---|---|---|---|---|---|
| 0 | 1 | 1 | 0 | 0 | 0 | 1 | 2 |
| 1 | 4 | 4 | 1 | 1 | 2 | 4 | 5 |
| 2 | 5 | 5 | 2 | 2 | 3 | 5 | 6 |
| 3 | 6 | 6 | 3 | 3 | 4 | 6 | 7 |
| 4 | 7 | 7 | 4 | 4 | 5 | 7 | 7 |
| 5 | 7 | 7 | 5 | 5 | 6 | 7 | 7 |
| 6 | 8 | 8 | 6 | 6 | 7 | 8 | 8 |
| 7 | 8 | 8 | 7 | 7 | 7 | 8 | 8 |
| 8 | 9 | 9 | 8 | 8 | 8 | 9 | 9 |
| 9 | 9 | 9 | 9 | 9 | 9 | 9 | 9 |

Figure 11

INK ESTIMATION ADJUSTMENT MECHANISM

FIELD OF THE INVENTION

The invention relates to the field of printing systems, and in particular, to performing ink usage estimation for a printing system.

BACKGROUND

In commercial and transactional printers, it is common to estimate ink usage to determine one of the major components of the cost to print a job with an ink jet printer. Conventional ink estimation methods involve having to first perform a rasterization (or raster image processing [RIP]) of the print job to produce a digital approximation to a continuous tone ("contone") image. Subsequently, the contone image is halftoned with the same halftone producing algorithms and settings to be employed by a targeted printer, resulting in a halftoned digital image (or bitmap) that describes the drop (or dot) size for each pixel. The halftoned bitmap encodes the different drop sizes using a unique symbol for each drop size (e.g., level zero for no drop, one for small, two for medium, and three for large).

In an actual ink jet printer this halftoned bitmap data would be the input to the drivers of ink jet printheads. Hence the data used in an actual printer is the same as the data used to estimate ink usage for a print job. Since the drop sizes for an ink jet are known, the amount of ink required to print the job for each color may be calculated from a tally of the various drop symbols on each page as the sum of ink for each drop size, page and color.

However, the above-described ink estimation process is computationally intensive, since it involves rasterization, followed by halftoning, followed by counting the ink drops by size. Methods to speed up the process involve estimating the ink for a down-sampled image and multiplying the result by the down-sampling factor. For example, down-sampling the contone image data by a factor of two in both directions results in a bitmap having one quarter of the pixels of the original. An estimate using the sum of the ink drops, based on the downsampled image must be scaled by a factor of four to obtain an estimate for the ink usage of the original contone image. Yet this process is of limited utility, since the down sampling factor can only be made so large (e.g., normally 2 or 4 depending on rasterization resolution) before the bitmap resolution/quality is so low/degraded that the estimate becomes too inaccurate.

Even with down-sampling, the fact that the halftoned bitmap is used for ink estimation means that both the original image and the halftoned image must be recomputed to obtain a new estimate, if any parameter is changed. This is a process which touches every pixel at least twice.

Printer users frequently desire to know the effect of changing various printer settings on the cost of printing a large job. Accordingly, an improved mechanism to perform ink estimation is desired.

SUMMARY

In one embodiment, an ink estimation adjustment method is disclosed. The method includes generating first estimated ink usage data for each of one or more color planes based one or more gray level histograms and one or more halftone designs, detecting a change to a tone curve of one or more of the color planes, modifying the gray level histograms and generating second estimated ink usage data for each of the color planes based on the modified gray level histograms, wherein each gray level histogram corresponds to one of the one or more color planes and each halftone design corresponds to one of the one or more color planes.

BRIEF DESCRIPTION OF THE DRAWINGS

A better understanding of the present invention can be obtained from the following detailed description in conjunction with the following drawings, in which:

FIG. 11 illustrates one embodiment of changing transfer functions;

DETAILED DESCRIPTION

A mechanism to perform an ink estimation adjustment for a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
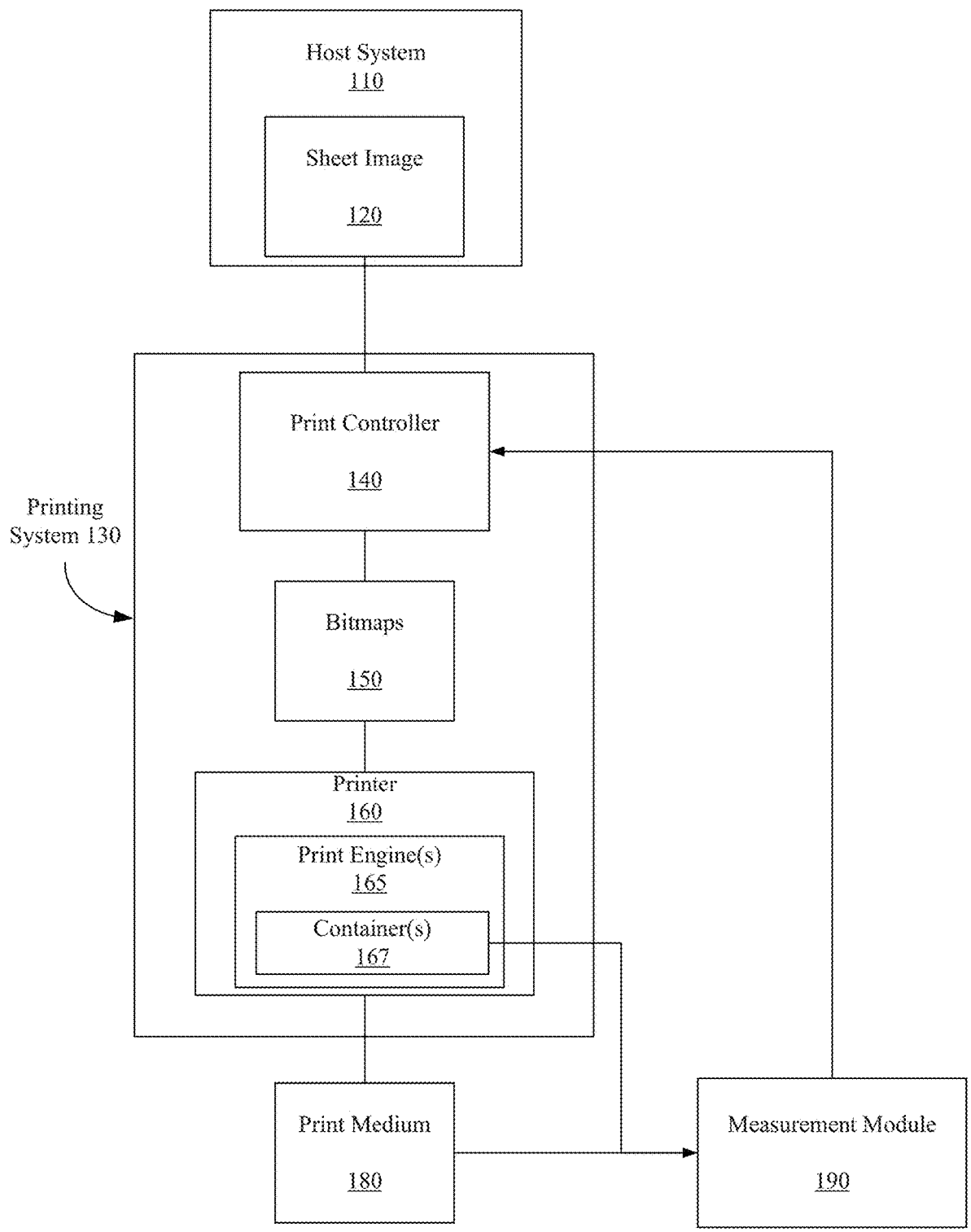
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 having one or more print engines 165 to present the bitmap 150 onto the print medium 180 via marking material (e.g., toner, ink, coatings, etc.) based on the sheet image 120. In a further embodiment, printer 160 includes containers 167 (e.g., bags, cartridges, etc.) to store the marking materials to be applied to print medium 180. Containers 167 may store marking material corresponding each of the color planes (e.g., marking material types and/or colors).

Print controller 140 and printer 160 may be both implemented in the same printing system 130 or implemented separately and coupled together. In another embodiment, print controller 140 may be implemented in host system 110 and coupled to printer 160. Print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

In one embodiment, measurement module 190 is implemented to obtain measurements of the printed medium 180. In a further embodiment, measurement module 190 is implemented to measure the weight (or mass) of containers 167. The measured results are communicated to print controller 140 to be used in an ink usage estimation process. The measurement system may be a stand-alone process or be integrated into the printing system 130.

Figure 2:
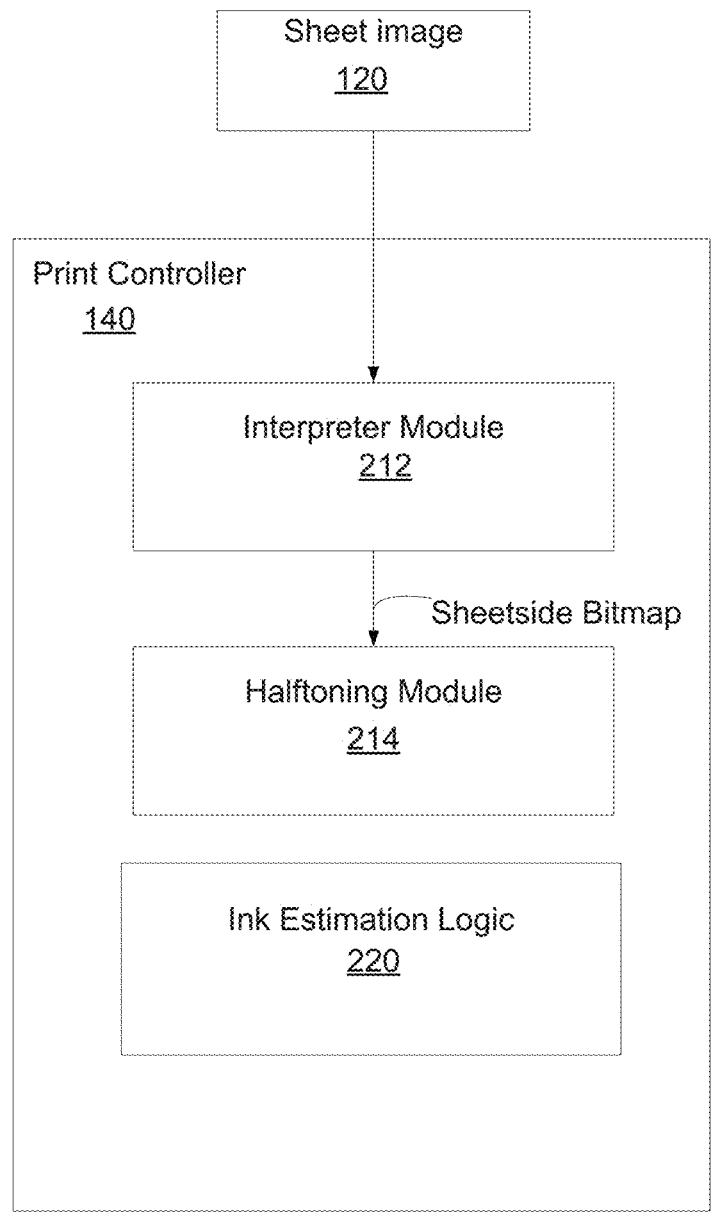
FIG. 2 is a block diagram illustrating one embodiment of a print controller.

FIG. 2 illustrate one embodiment of a print controller 140. As shown in FIG. 2, print controller 140 (e.g., DFE or digital front end), in its generalized form, includes interpreter module 212, halftoning module 214 and ink estimation logic 220. Interpreter module 212 is operable to interpret, render, rasterize, or otherwise convert images (e.g., raw sheetside images such as sheet image 120) of a print job into sheetside bitmaps.

The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image.

Interpreter module 212 is operable to interpret or render multiple raw sheetsides concurrently so that the rate of rendering substantially matches the rate of imaging of production print engines. In one embodiment, the rate of rendering does not apply to stand alone ink estimation components since it is not actually driving a printer. In such an embodiment, the only requirement is producing an estimate in a reasonable amount of time.

Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location. In one embodiment, the halftone design may include a finite set of transition thresholds between a finite collection of successively larger drop sizes, beginning with zero and ending with a maximum drop size (e.g., threshold arrays or multibit threshold arrays). In another embodiment, the halftone design may include a three dimensional look-up table with all included gray level values. In a further embodiment, halftoning module 214 performs the multi-bit halftoning using the halftone design (e.g. multi-bit threshold arrays (MTAs)).

Multi-bit halftoning is a halftone screening operation in which the final result is a selection of a specific drop size available from an entire set of drop size that the print engine is capable of employing for printing. Drop size selection based on the value of a single pixel is referred to as "Point Operation" halftoning. This contrasts with "Neighborhood Operation" halftoning, where multiple pixels in the vicinity of the pixel being printed are used to determine the drop size. Examples of neighborhood operation halftoning include the well-known error diffusion method. The drop size selection is based on the pixel values in the sheetside bitmap.

Multi-bit halftoning is an extension of binary halftoning. Binary halftoning may use a single threshold array combined with a logical operation to decide if a drop is printed based on the contone level for a pixel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than and less than or equal to operations to determine the drop size by comparing the threshold and image contone data for each pixel. Multi-bit defines a power of two set of drop sizes (e.g., two bit halftone designs have four total drops, including a zero drop size). While power of two may be employed to define the number of drops, systems not following this such as a three total drop system may be used and are still considered multi-bit.

Figure 3:
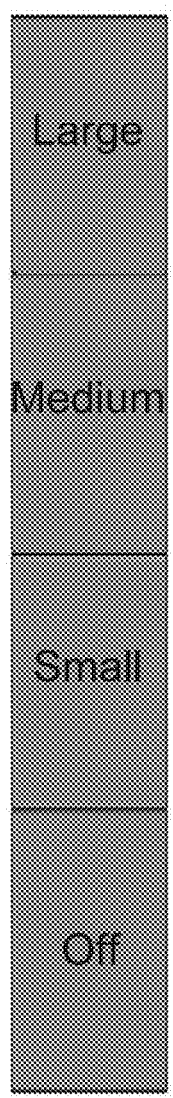
FIG. 3 illustrates one embodiment of multibit halftone designs, where the halftones are described using multi-bit threshold arrays (MTAs)

For multi-bit halftones, as shown in FIG. 3, the MTA is a three-dimensional array including one two-dimensional array for each drop size transition. Thus an MTA includes a set of two-dimensional arrays of thresholds for transition between drop sizes: MTA_array(:,:,1) plane one provides the threshold for the Large output level, while MTA_array(:,:,2) plane 2 and MTA_array(:,:,3) plane 3 provide thresholds for the Medium and Small output levels respectively for a system having three drop sizes not including zero drop size (none or Off).

To use these threshold arrays for halftoning, each multibit threshold array is tiled across contone image data provided by the sheetside bitmap, which provides a set of threshold values for each pixel in the sheetmap. The contone image data (e.g., gray level data) is logically compared to the threshold data on a pixel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined based on the contone values.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Figure 4:
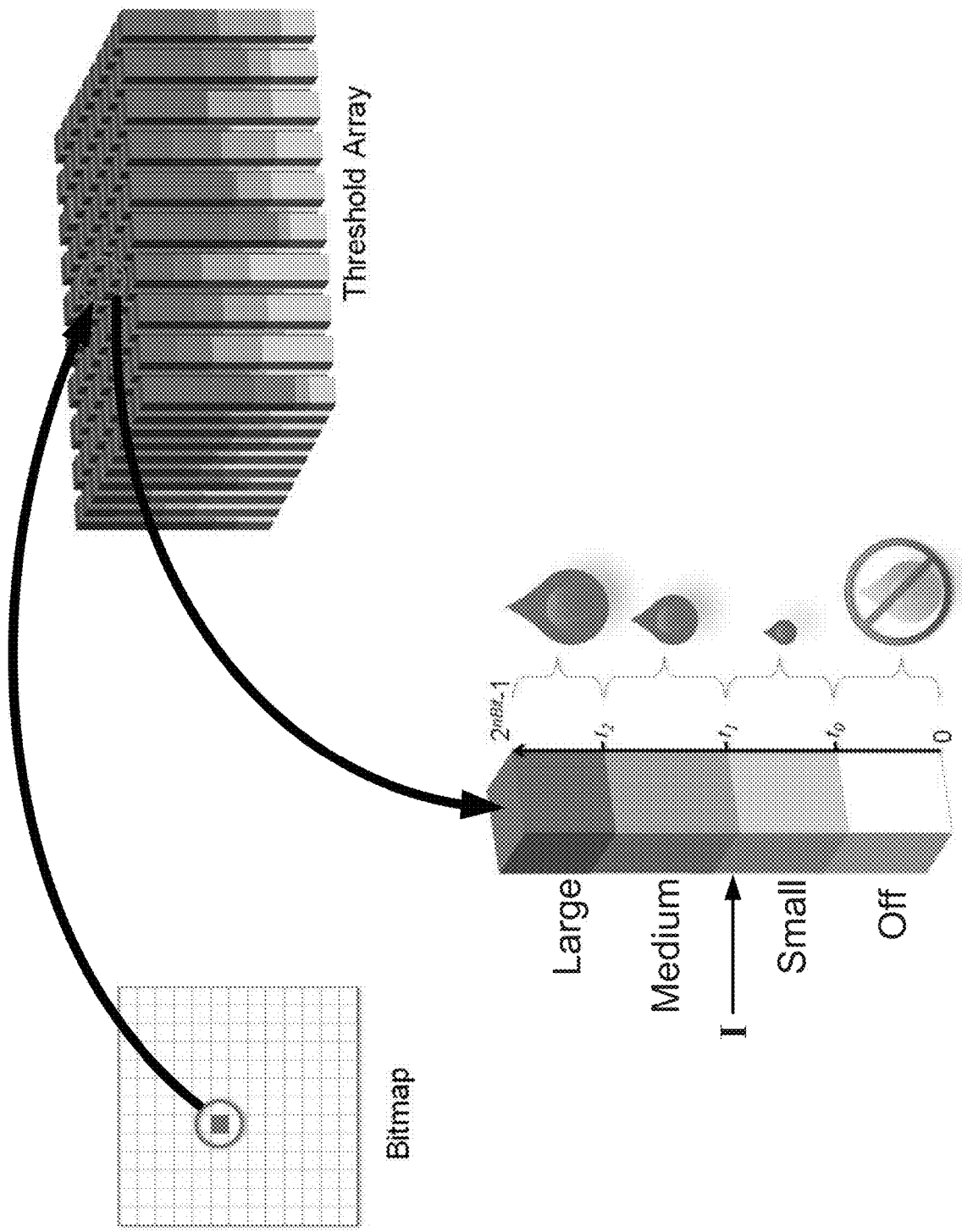
FIG. 4 illustrates another embodiment of multibit halftone designs using MTAs.

FIG. 4 illustrates another embodiment of halftoning via a MTA that consists of determining which "bin" a particular pixel is to be included, and subsequently selecting the corresponding drop size. In this embodiment, the logical comparison operations described previously are depicted by individual "totem poles" for each corresponding pixel of image data. Drop size determination is performed by finding which bin the threshold levels index. It should be appreciated from FIG. 4 that each totem pole may have different bin ranges for each different drop size.

In a further embodiment, definition of the mapping ranges for each drop size bin are defined by the threshold values $t_0$, $t_1$, $t_2$, which are specific values for that pixel location from the multibit threshold array. As shown in FIG. 4, each pixel in the bitmap selects a specific corresponding totem pole. The gray level for that pixel in the bitmap is then mapped to a particular bin, and a drop size I (e.g., $0\text{-}2^{nBit-1}$) is selected. The total height of the totem poles is related to the bit depth of the contone data. In an 8-bit printing system, nBit equals 8. Therefore in that case, the top of the totem pole corresponds to level 255 ($2^8-1$), which is the largest digital count value permitted for this 8-bit printing system.

Referring back to FIG. 2, ink estimation logic 220 is implemented to provide an estimation of ink that is to be used to produce a print job (or each page of the print job). In such an embodiment, ink estimation logic 220 uses histograms generated for each color plane (e.g., CMYK) and MTAs for each color plane to estimate the print job ink usage. Although shown as being implemented in print controller 140, other embodiments may feature ink estimation logic 220 being implemented in any type of computing devices, such as host system 110.

Figure 5:
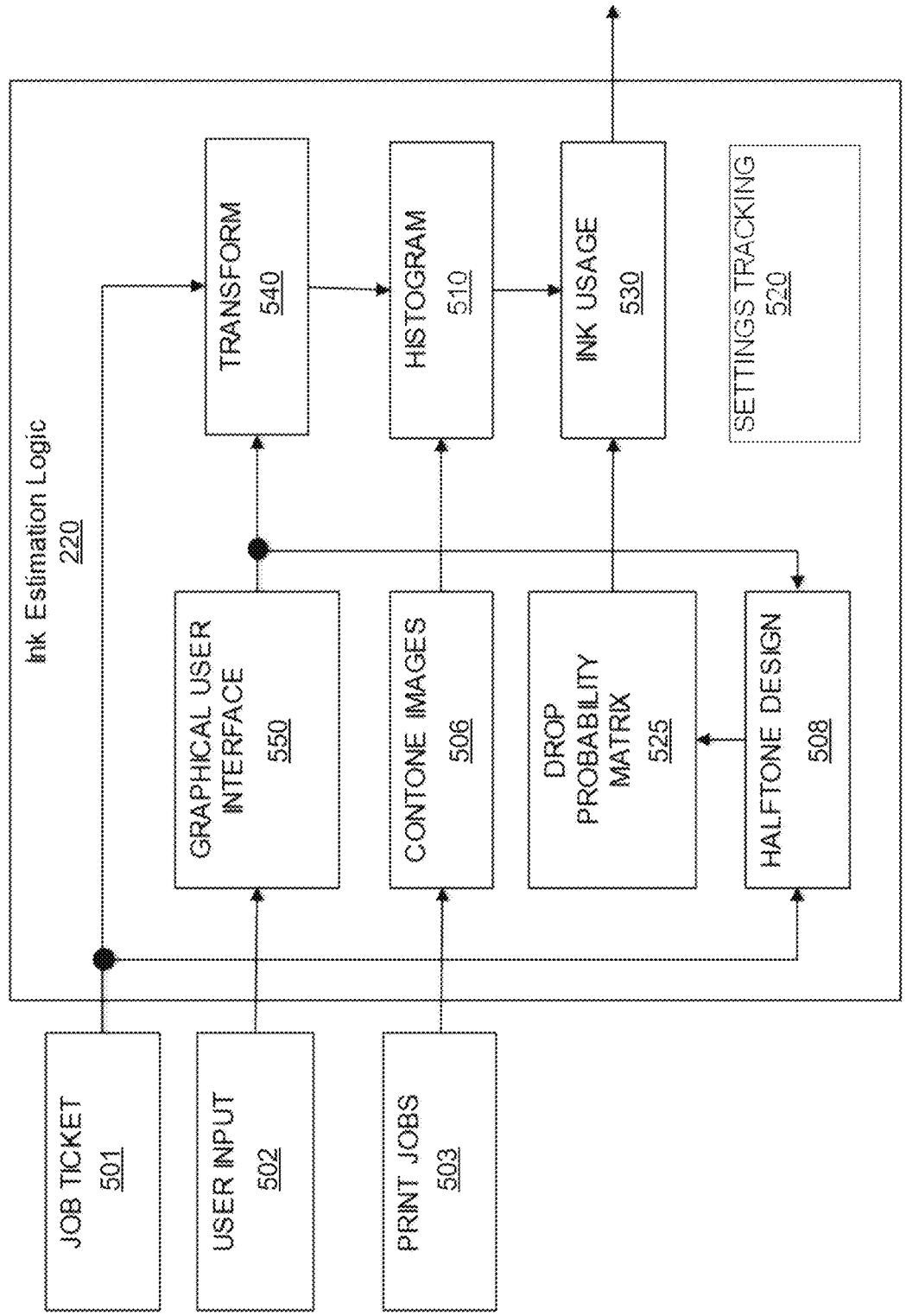
FIG. 5 illustrates one embodiment of ink estimation logic.

FIG. 5 illustrates one embodiment of an ink estimation logic 220, including histogram engine 510, settings tracking module 520, ink usage calculator 530, transform logic 540 and graphical user interface (GUI) 550. Histogram engine 510 generates a histogram based on the contone images 506 for each color plane implemented to print a print job 503 without requiring that the contone image be halftoned. The histogram is a distribution of the contone image 506 data for every gray level for each color plane over the total print job, which includes all pixels.

The histogram can be viewed as a function or table H(x) defined over all possible pixel values (or gray levels) x in the contone image that tells how many times gray level x occurs in the print job (or in any portion of the print job for which an ink estimate is desired). For color images, the histogram H(x) is a vector-valued function or table with one component for each color plane (e.g. a four-component vector for a job sent to a CMYK printer). Such a vector-valued histogram comprises a collection of scalar-valued histograms: one for each color of ink.

In one embodiment, histogram engine 510 receives contone images 506 corresponding to each color plane of a print job 503 that is to be printed and generates a histogram for each color plane by counting the digital count value for each pixel over a total range of allowable digital count values. For a CMYK contone image 506, the total number of gray levels per color plane=$2^n$, where n=bit depth. Accordingly, four histograms are generated to define all possible colors for a print job 503 in the CMYK color space.

In other embodiments, more colorants may be used (e.g., Orange, Green, Violet, Magnetic Ink Character Recognition (MICR), Protector, etc.) and those planes may be processed/estimated likewise. In a further embodiment, histograms may show the distribution with bucket sizes having multiple gray levels in each bucket to increase performance with a small decrease in accuracy.

In other embodiments highly, efficient single pass processing of the MTAs can be employed which do not require storage of the entire MTA threshold array in memory. Such methods include computing the fractional distributions of drops utilizing only the required threshold data. In addition, the distribution only needs to be computed for the number of gray levels used with the histogram data. In doing this, we can quickly read/analyze/discard portions of the MTA data to form the fractional distributions we need.

Settings tracking module 520 acquires and stores print job settings and printer system settings that are used in conjunction with the histograms and the MTAs to perform ink estimation. In one embodiment, the print job settings and printer system settings are received as user input 502 via a GUI 550 included for ink estimation logic 220. However other embodiments may comprise settings tracking module 520 receiving the print job settings information via a job ticket 501 submitted with the print job 503 and/or components of print controller 140.

In one embodiment, the system selects the halftone MTA files corresponding to the same halftone files which may be used to print the job using the same settings (e.g., print job settings and/or printer system settings). Furthermore, the histogram is generated using contone data produced by rasterizing the job employing the same color management and transfer functions which are used to print the job. The impact of engine calibration transfer functions may be included in the halftone MTA files or alternately they can be included with the color management when computing the histograms.

In one embodiment, print job settings include information, such as scaling, n-up or other imposition, print quality/resolution, number copies, simplex/duplex. In a further embodiment, one or more of these print job settings may be included in a print job settings group (e.g., a job ticket). Moreover, many of the print job settings may already be accounted for in sheetmaps, such as imposition, resolution and number of copies. In yet a further embodiment, print job settings may include information other details regarding the rasterization process (e.g., color management settings, job processor, etc.), which determine the specifics of the histograms.

Printer system settings may also include information for printer 160 that may determine the MTAs that are selected and/or implemented. In one embodiment, printer system settings may include print speed, print resolution, calibration, hardware settings and adjustments, uniformity, flushing type, post-processing marks, undercoat/overcoat type, ink type selection, density mode, print speed or the printer type/model, etc.

Figure 6:
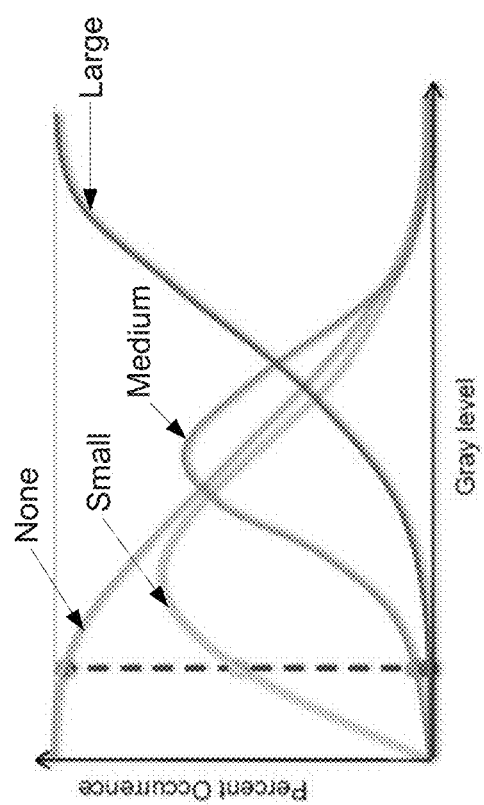
FIG. 6 illustrates one embodiment of a graph showing a distribution of drop volumes for each gray level.
Figure 6:
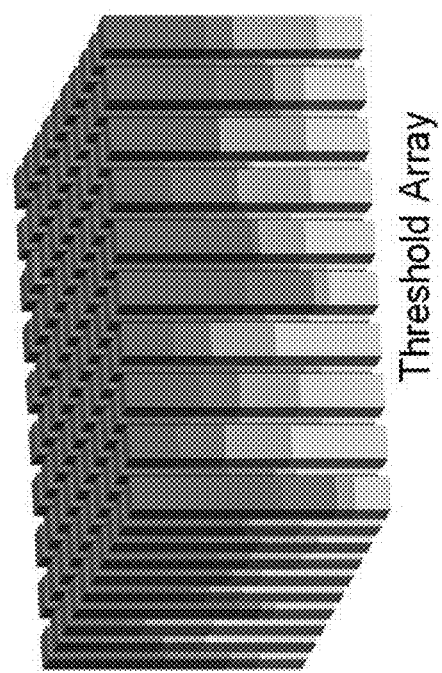

Ink usage calculator 530 determines an estimated ink usage based on the color histograms and halftone design 508 (e.g. MTAs). Halftone design 508 may be received by ink estimation logic 220 from memory or from other input to ink estimation logic 220. As discussed above, the color histograms and MTAs may be selected based on the print job settings and/or print system settings. According to one embodiment, drop probability matrix module 525 analyzes the MTA to determine a fractional distribution of drop volumes that will be encountered for each gray-level. In such an embodiment, a percentage of Zero, Small, Medium, and Large drops are determined for each gray level. Employing this same approach with a binary (single drop size) halftone is a case that is also covered by these equations and methods. FIG. 6 illustrates one embodiment of a graph showing a distribution of percent drop occurrence rates for each gray level for a multi-bit threshold array for each of 4 drop sizes (including the Zero or "none" drop).

Upon determining the distribution of percent drop occurrence rates for each size drop, ink usage calculator 530 combines this with the histograms to determine the estimated number of expected Zero, Small, Medium, and Large drops for the entire print job 503. In one embodiment, the determination is made via matrix multiplication, such that:

$$n = R \cdot h, \text{ where}$$

n=Estimated Drop Counts $[n_{Drop} \times 1]$ vector, R=Occurrence Rate $[n_{Drop} \times n_{GrayLevel}]$, matrix, and h=Histogram $[n_{GrayLevel} \times 1]$ vector.

Since the percent drop occurrence rates represent a fraction, values from zero to one are used when computing the number of drops using these equations. Based on the above, an ink estimate total volume may be determined by multiplying and summing the expected total drop counts with their respective drop volumes (e.g., the vector dot product of drop counts with drop volumes), such that:

$$v = d \cdot n$$

$$= d \cdot (R \cdot h), \text{ where}$$

v=Estimated Volume scalar, d=Drop Volumes $[1 \times n_{Drop}]$ vector.

According to one embodiment, drop volumes may be determined at ink usage calculator 530 by a generating a regression model between ink monitor data (e.g., drop counts determined by actually printing the job), and a physical weighing of the marking material in each of the containers 167 (e.g., ink in ink bags or reservoirs) received from measurement module 190. In many cases, marking material volume and mass are related units of measurement for marking material amounts that may be readily converted from one unit to another as needed. In such an embodiment, ink usage calculator 530 may receive periodic measurements from measurement module 190. Ink monitor systems counting actual drops can be compared to the values from the described ink estimator which provides estimated drop counts. This allows direct comparison of the counts from the two methods which should be nearly identical for a given job being printed/estimated.

In such a system, refined estimates for drop sizes (which may be in units of volume or mass) may be obtained over time based on large volume printing, drop counts and measurements. These refined drop size estimates can then be employed dynamically with the ink estimates to be adaptive to the print system or fixed values may be used after sufficient training has occurred to obtain stable drop size values. Fixed values assure that customers obtain the same estimates for all printing systems which are representative of an average system.

For instance, measurement module 190 may weigh containers 167 before and after printing a job to determine an actual quantity of each of the ink colors that has been consumed by print engines 165. In another embodiment, ink usage calculator 530 may receive dynamic (or continuous) measurements from measurement module 190. In such an embodiment, ink calculator 530 may perform Kalman filtering (or other tracking algorithms) to determine the most recent ink usage.

Transform logic 540 is implemented to apply a transform to one or more histograms upon a detection of a tone curve change at printing system 130 (e.g., via a job ticket 501 and/or user input 502) to one or more of the color planes. In one embodiment, transform logic 540 transforms the row indices of a histogram to account for color transformations, which enables ink usage calculator 530 to update (or adjust) the ink estimate for the color planes by performing a matrix multiplication.

Figure 7:
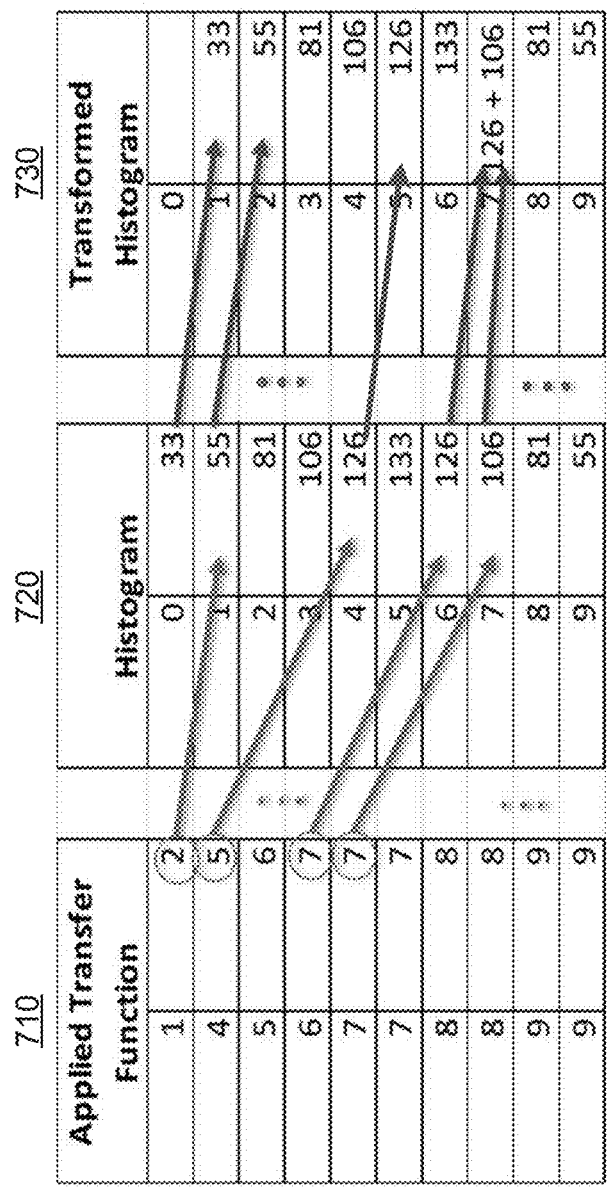
FIG. 7 illustrates one embodiment of using a transfer function to transform a histogram.
Figure 8:
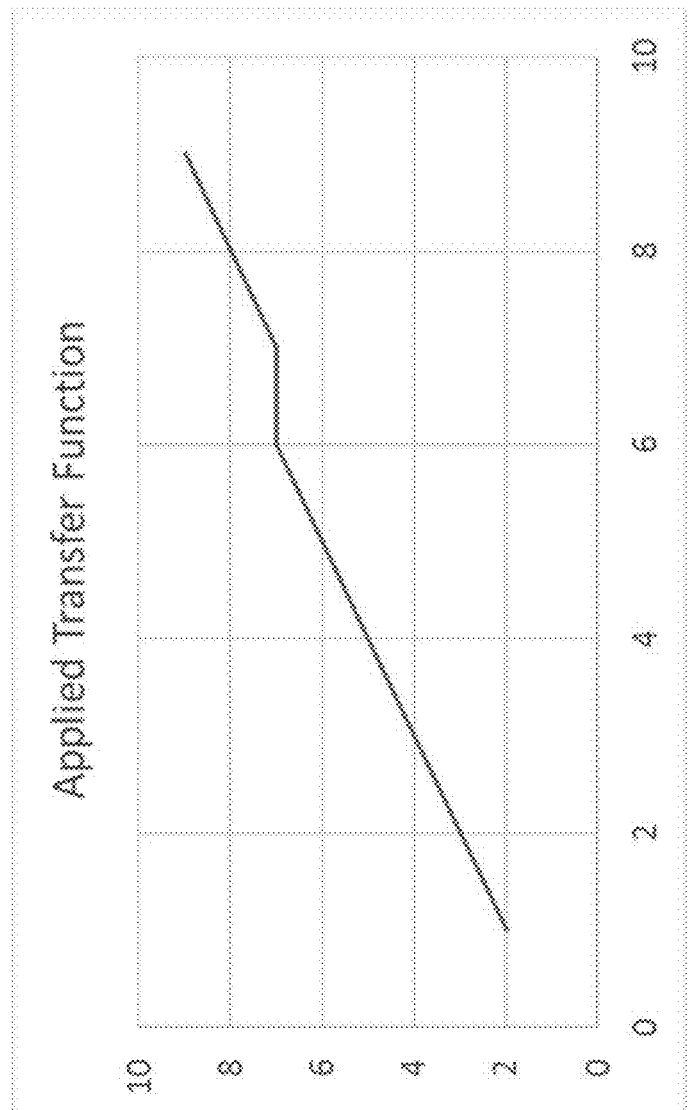
FIG. 8 illustrates one embodiment of an applied transfer function curve.

In one embodiment, image histograms may be transformed to precisely account for the effect of applying a transfer function to a printed image. FIG. 7 illustrates one embodiment of using a transfer function to transform a histogram. A transfer function is defined as a mapping of the space of color (e.g., gray, tint) values (e.g., levels) into itself. Thus, transfer functions may be thought of as curves or tables that show an output color value for each input color value. FIG. 8 illustrates one embodiment of an applied transfer function curve.

Further, histograms may be thought of as plots or tables that show a number of each tint that occurs in a given print job 503 or collection of print jobs 503. Accordingly, histograms may be presented as a table of numbers in order to transform an original image histogram to precisely account for the effect of applying a known transfer function to a printed image.

As shown in FIG. 7, applied transfer function table 710, histogram table 720 and transformed histogram table 730 are presented. The first column of the histogram table 720 provides the color values, while the second column provides the number of the associated color values in the print job(s) 503. In one embodiment, transformed histogram table 730 is generated from histogram table 720 by starting with a table having a blank second column. Subsequently, values are taken from the second column of the original histogram table 720 and applied in the second column of a possibly different row of the transformed histogram table 730.

In one embodiment, the row number in the transformed histogram table 730 is determined by applying the transfer function to the row number in the original histogram table 720, as illustrated in FIG. 7. In a further embodiment, all of the values are added to calculate a final value in table 730 when more than one value is mapped into the same row of the second column of the transformed histogram table 730.

Figure 9:
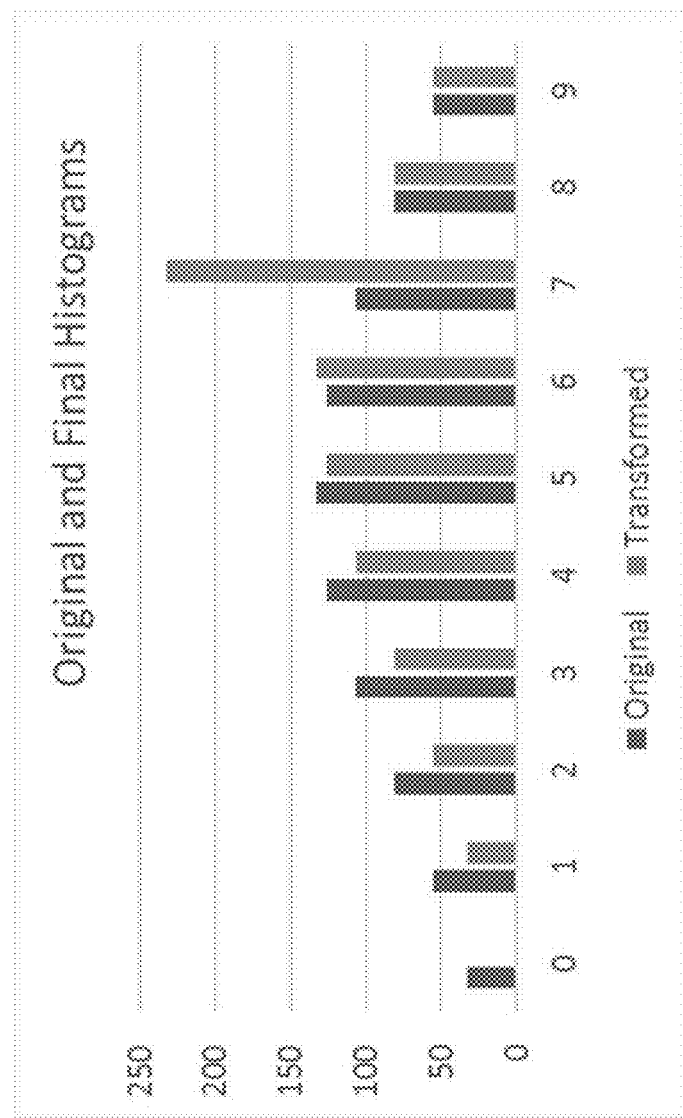
FIG. 9 illustrates one embodiment of histograms.

FIG. 9 illustrates one embodiment of the original and transformed histogram values.

If a print job has already been rasterized using a known color transform, and we have computed its histogram, we do not need to transform and count every gray value in the contone images to compute the transformed histogram for the same print job, that would result, had it been rasterized using a different color transform. Let the original color transform used in the actual rasterization of the print job be $T_0$. Let the new transformation, for which a transformed ink estimate is desired be $T_1$.

To transform the already-transformed color values in the contone image that results from rasterization, we would apply $T_A = T_1 \circ T_0^{-1}$, where the symbol $\circ$ represents composition of functions and the superscript $-1$ appearing on $T_0$ represents the inverse function of $T_0$. Composition of functions is a way of generating a new function from two given functions.

Given the argument x for the new function, we first apply the right hand function to x, then we apply the left hand function, using the output value of the right hand function as an input to the left hand function. The function "$T_1$ composed of $T_0$" in this way generates a new function, which we call $T_A$, because it is the transformation that we would actually apply to transform the contone image from the original rasterization of the print job to account for the effect of using a different color transform $T_1$ instead of the original color transform $T_0$.

However, it is not necessary to apply $T_A$ to the entire contone image from the original rasterization using color transformation $T_0$ in order to obtain the histogram that would result from a second rasterization using a different color transformation $T_1$, nor is it necessary to recompute the histogram that would result from such a transformation of the contone image. Instead, we can obtain the histogram for the second rasterization using far fewer operations by using the applied transformation to transform the histogram from the original rasterization. Not only is it unnecessary to re-rasterize the print job. It is not even necessary to re-transform the previous rasterization of it. For a large print job comprising thousands of pages, many billions of operations are thereby replaced by a several hundred operations without any loss of accuracy in the resulting histogram.

Figure 10:
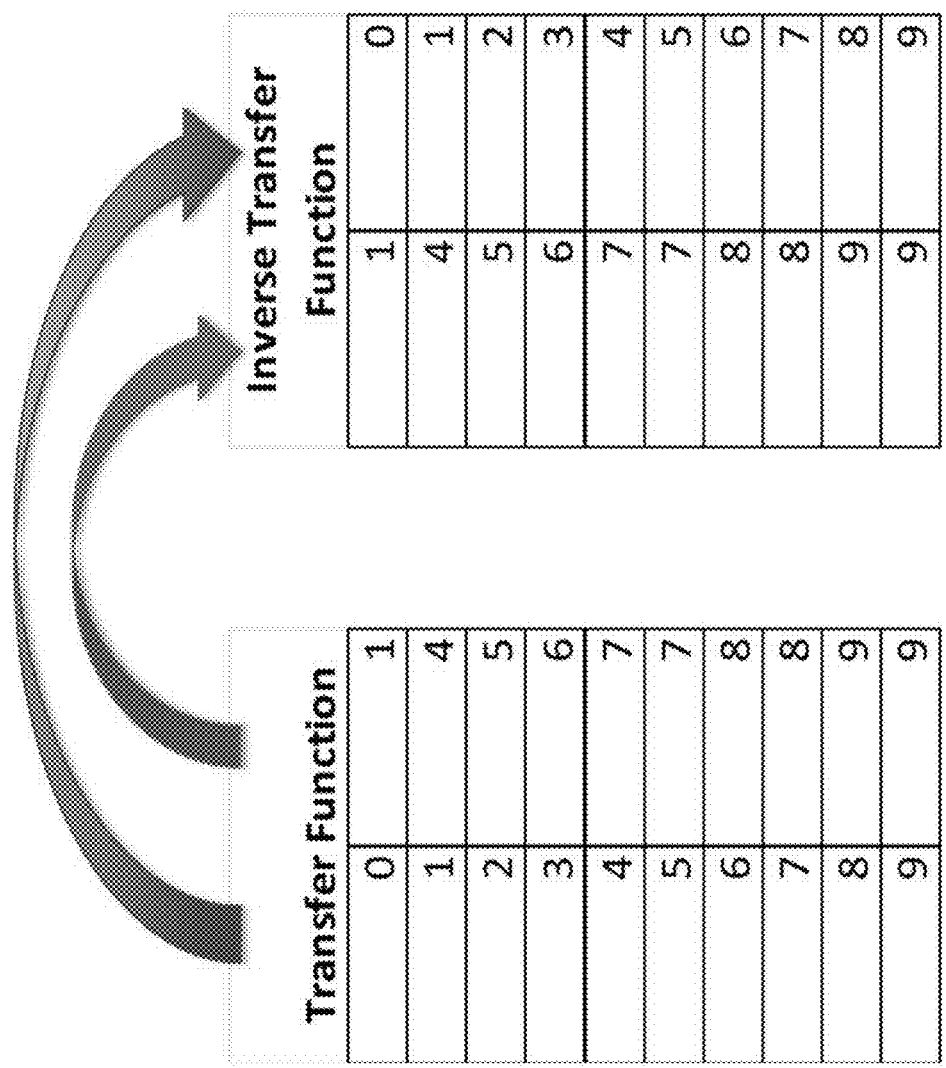
FIG. 10 illustrates one embodiment of computation of an inverse transfer function.

According to one embodiment, an inverse of an original transfer function applied during a previous rasterization is computed to transform the histograms. FIG. 10 illustrates one embodiment of computation of an inverse transfer function. As shown in FIG. 10, the inverse transform is computed by swapping the first and second columns in the transfer function table. In one embodiment, values that do not appear in the first column of the new inverse transfer function table are either interpolated or extrapolated. In a further embodiment, values that appear more than once are averaged. However in other embodiments a minimum, maximum, or median value may be used for values that appear more than once.

FIG. 11 illustrates one embodiment of using the inverse of an original transfer function and a desired (or final) transfer function $T_1$ to compute the applied transfer function, $T_A$, as described above. In one embodiment, the applied transfer function transforms the histogram from the original rasterization (that used the original transfer function) to a modified histogram reflecting the final rasterization (that uses the final transfer function $T_1$). As shown in FIG. 11, determining the applied transfer function for each color value in the current rasterized image is a two-step process.

The first step of the process is to apply the inverse original transfer function to obtain a first transformed color value. Subsequently, the final transfer function is applied to obtain a second transformed color value. The second transformed tint is then entered into the original color value in the applied transfer function table. This process is repeated for every color value. In one embodiment, an interpolation (or extrapolation) is performed to obtain a value for tints that do not appear in the original rasterized image. Since these tints do not appear, the interpolated or extrapolated values will not actually be used, but they may be computed to fill out the table, or they may be set to any convenient value.

Figure 12:
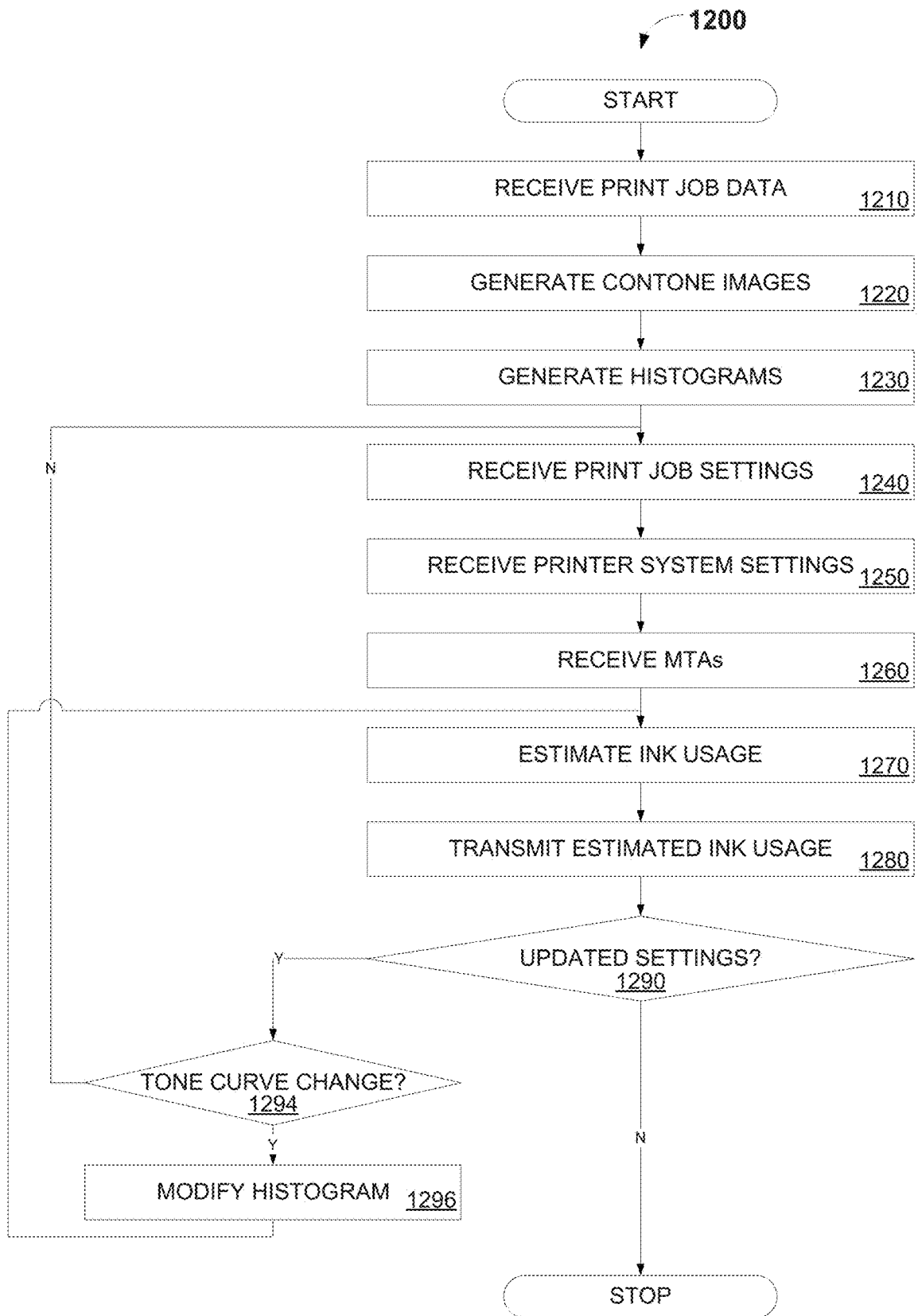
FIG. 12 is a flow diagram illustrating one embodiment for performing an ink estimation process.

FIG. 12 is a flow diagram illustrating one embodiment of a process 1200 for performing ink estimation. Process 1200 may be performed by processing logic that may comprise hardware (e.g., circuitry, dedicated logic, programmable logic, etc.), software (such as instructions run on a processing device), or a combination thereof. In one embodiment, process 1200 may be performed by ink estimation logic 220. The process 1200 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-11 are not discussed or repeated here.

Process 1200 begins at processing block 1210, where print job 503 data may be received. In one embodiment, a job ticket 501 (e.g., Job Definition Format (JDF)) may also be received with the print job 503 data. At processing block 1220, contone images 506 are received or generated based on the print job 503, and job ticket 501 if included. At processing block 1230, histograms are received or generated for each color plane based on the contone images 506.

At processing block 1240, print job settings are received. At processing block 1250, the printer system settings may be received. As discussed above, the print job settings and printer system settings may be received via GUI 550, from host system 110 or any combination of the GUI 550 and host system 110. At processing block 1260, the MTAs may be received or selected. In one embodiment, an MTA is received for each color plane to account for different ink characteristics of each color and to avoid dot on dot placement of different colors. At this point processing of the MTA occurs to determine the percent drop occurrence distributions for each drop size for each color plane.

At processing block 1270, the estimated volume of ink usage for each color plane is determined, as discussed above, based on the histograms and the MTAs. At processing block 1280, the estimated ink usage data is transmitted (e.g., reported). In one embodiment, estimated ink usage is displayed via GUI 550. However in other embodiments, print controller 140 may transmit estimated ink usage data to an external computing device.

At decision block 1290, a determination is made as to whether one or more of the print job settings, and/or printer system settings have been changed or updated. If not, the process has completed. However, if a change/update has been detected, a determination is made as to whether the changed/updated settings consists of a tone curve change, decision block 1294.

Upon a determination that a tone curve change has occurred, one or more histograms are modified, as discussed above, by applying a transform, processing block 1296. Subsequently, control is returned to processing block 1270, where an adjusted estimated volume of ink usage for each color plane is determined based on the modified histograms.

If at decision block 1294 a determination is made that the changed/updated settings is not a tone curve change, control is returned for execution of processing blocks 1240-1280 with a different MTA corresponding to the changed/updated settings.

Figure 13:
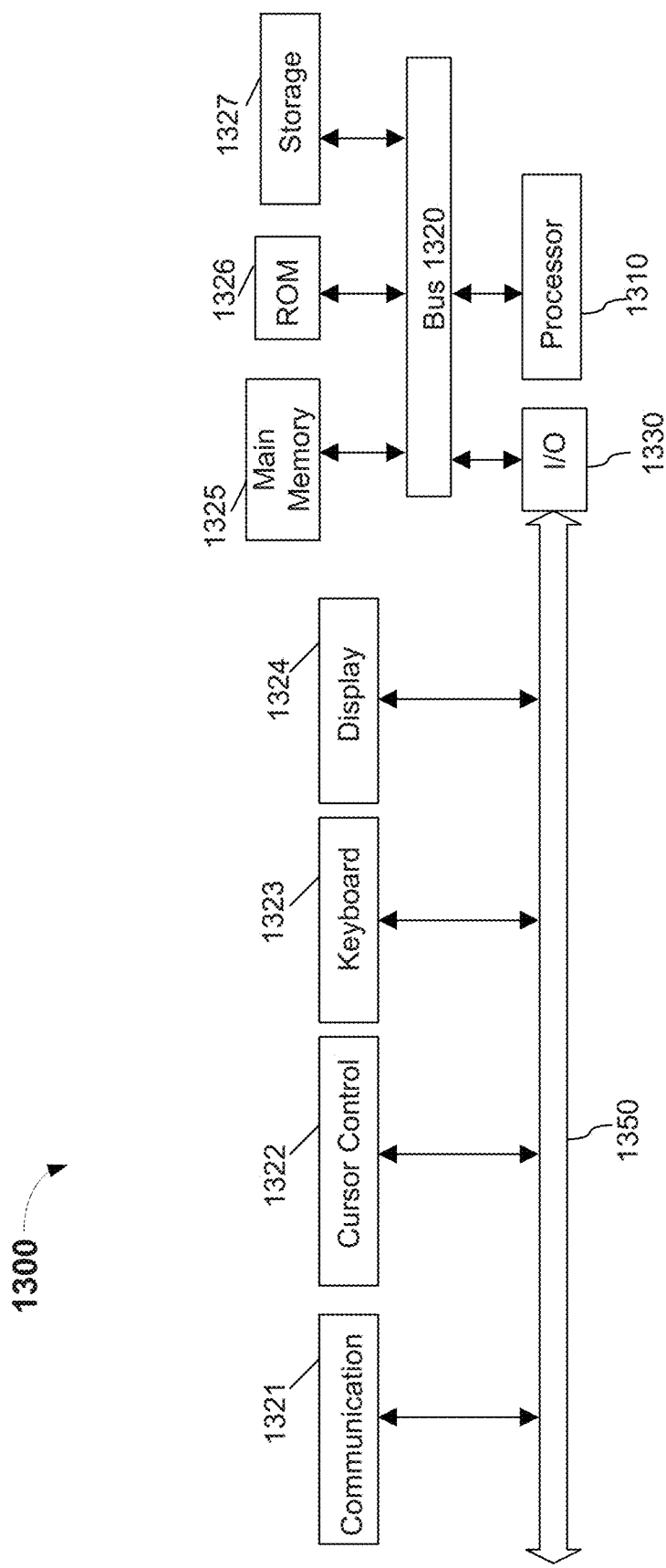
FIG. 13 illustrates one embodiment of a computer system.

FIG. 13 illustrates a computer system 1300 on which printing host 110, printing system 130 and/or print controller 140 may be implemented. Computer system 1300 includes a system bus 1320 for communicating information, and a processor 1310 coupled to bus 1320 for processing information.

Computer system 1300 further comprises a random access memory (RAM) or other dynamic storage device 1325 (referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., a keyboard 1323 (e.g., alphanumeric input device) and or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
    at least one physical memory device to store ink estimation logic; and
    one or more processors coupled with the at least one physical memory device to execute the ink estimation logic to generate first estimated ink usage data for each of one or more color planes based one or more gray level histograms and one or more halftone designs, detect a change to a tone curve of one or more of the color planes, modify the gray level histograms and generate second estimated ink usage data for each of the color planes based on the modified gray level histograms, wherein each gray level histogram corresponds to one of the one or more color planes and each halftone design corresponds to one of the one or more color planes.

2. The system of claim 1, wherein modifying the gray level histograms comprises performing a color transformation on the one or more of the gray level histograms to generate transformed ink usage data.

3. The system of claim 2, wherein the second estimated ink usage data is generated based on the first estimated ink usage data and the transformed ink usage data.

4. The system of claim 3, wherein the ink estimation logic determines whether one or more settings have been changed after generating the first estimated ink usage data.

5. The system of claim 4, wherein the ink estimation logic further determines whether a change to the settings comprises the change to a tone curve.

6. The system of claim 5, wherein the ink estimation upon a determination that the change to the settings does not comprise the change to a tone curve, generates a third estimated ink usage data for each of the color planes based on the gray level histograms and one or more halftone designs.

7. The system of claim 1, wherein generating estimated ink usage data comprises determining an estimated ink drop count for each of the color planes, determining ink drop volumes for each of the color planes and determining the estimated ink usage data for each of the color planes based on the estimated ink drop count and the ink drop volumes.

8. The system of claim 7, wherein determining the estimated ink drop count for each of the color planes comprises determining an occurrence rate for each of a plurality of ink drop sizes and determining an estimated quantity of ink drops based on the occurrence rate and the gray level histograms.

9. The system of claim 1, further comprising a measurement module to receive measurement data including the ink drop volumes.

10. The system of claim 1, further comprising a printer.

11. At least one non-transitory computer readable medium having instructions stored thereon, which when executed by one or more processors, cause the processors to:
    generate first estimated ink usage data for each of one or more color planes based one or more gray level histograms and one or more halftone designs;
    detect a change to a tone curve of one or more of the color planes;
    modify the gray level histograms; and
    generate second estimated ink usage data for each of the color planes based on the modified gray level histograms, wherein each gray level histogram corresponds to one of the one or more color planes and each halftone design corresponds to one of the one or more color planes.

12. The computer readable medium of claim 11, modifying the gray level histograms comprises performing a color transformation on the one or more of the gray level histograms to generate transformed ink usage data.

13. The computer readable medium of claim 12, wherein the second estimated ink usage data is generated based on the first estimated ink usage data and the transformed ink usage data.

14. The computer readable medium of claim 13, having instructions stored thereon, which when executed by the one or more processors, further cause the processors to determine whether one or more settings have been changed after generating the first estimated ink usage data.

15. The computer readable medium of claim 14, having instructions stored thereon, which when executed by the one or more processors, further causes the processors to determine whether a change to the settings comprises the change to a tone curve.

16. A method comprising:
    generating first estimated ink usage data for each of one or more color planes based one or more gray level histograms and one or more halftone designs;
    detecting a change to a tone curve of one or more of the color planes;
    modifying the gray level histograms; and
    generating second estimated ink usage data for each of the color planes based on the modified gray level histograms, wherein each gray level histogram corresponds to one of the one or more color planes and each halftone design corresponds to one of the one or more color planes.

17. The method of claim 16, wherein modifying the gray level histograms comprises performing a color transformation on the one or more of the gray level histograms to generate transformed ink usage data.

18. The method of claim 17, wherein the second estimated ink usage data is generated based on the first estimated ink usage data and the transformed ink usage data.

19. The method of claim 18, further comprising determining whether one or more settings have been changed after generating the first estimated ink usage data.

20. The method of claim 19, further comprising receiving one or more printer system settings implemented to select the halftone designs.

21. The method of claim 20, further comprising determining whether a change to the settings comprises the change to a tone curve.

* * * * *